United States Patent
Kang et al.

(10) Patent No.: US 6,458,462 B1
(45) Date of Patent: Oct. 1, 2002

(54) SPORTING GOODS HAVING A CERAMER COATING

(75) Inventors: Soonkun Kang, Lake Elmo; Forrest J. Rouser, Stillwater, both of MN (US); Susan K. Rowen, Hudson, WI (US); Steven J. Martin, Shoreview, MN (US); Michael S. Terrazas, Prescott, WI (US); Scott G. Norquist, St. Paul, MN (US); James L. Sadlo, Round Rock, TX (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/736,104

(22) Filed: Dec. 13, 2000

(51) Int. Cl.$^7$ .................................. B32B 9/04
(52) U.S. Cl. ................. 428/447; 428/331; 428/336; 428/407; 428/409; 428/412; 428/446; 252/582; 252/589; 252/600
(58) Field of Search ................. 428/447, 331, 428/336, 407, 409, 412, 446; 252/582, 589, 600; 473/282; 36/117.1; 2/410

(56) References Cited

U.S. PATENT DOCUMENTS

| | | |
|---|---|---|
| 4,438,190 A | 3/1984 | Ishimaru et al. |
| 4,455,205 A | 6/1984 | Olson et al. |
| 4,478,876 A | 10/1984 | Chung |
| 4,486,504 A | 12/1984 | Chung |
| 4,491,508 A | 1/1985 | Olson et al. |
| 4,499,217 A | 2/1985 | Yoshimura et al. |
| 4,568,598 A | 2/1986 | Bilkadi et al. |
| 4,885,332 A | 12/1989 | Bilkadi |
| 4,906,523 A | 3/1990 | Bilkadi |
| 5,049,371 A | 9/1991 | Rinn et al. |
| 5,104,929 A | 4/1992 | Bilkadi |
| 5,116,644 A | 5/1992 | Asai et al. |
| 5,126,394 A | 6/1992 | Revis et al. |
| 5,143,988 A | 9/1992 | Wang et al. |
| 5,258,225 A | 11/1993 | Katsamberis |
| 5,310,577 A | 5/1994 | Mase et al. |
| 5,316,855 A | 5/1994 | Wang et al. |
| 5,372,796 A | 12/1994 | Wellinghoff |
| 5,391,210 A | 2/1995 | Bilkadi et al. |
| 5,403,513 A | 4/1995 | Sato et al. |
| 5,459,220 A | 10/1995 | Kennedy |
| 5,470,910 A | 11/1995 | Spanhel et al. |
| 5,494,949 A | 2/1996 | Kinkel et al. |
| 5,639,546 A | 6/1997 | Bilkadi |
| 5,654,090 A | 8/1997 | Kayanoki |
| 5,677,050 A | 10/1997 | Bilkadi et al. |
| 5,698,309 A | 12/1997 | Dallman et al. |
| 5,720,805 A | 2/1998 | Wellinghoff et al. |
| 5,721,299 A | 2/1998 | Angelopoulos et al. |
| 5,945,172 A | 8/1999 | Yamaya et al. |
| 6,132,861 A | 10/2000 | Kang et al. |
| 6,136,386 A | 10/2000 | Nakahigashi et al. |

FOREIGN PATENT DOCUMENTS

| | | |
|---|---|---|
| CA | 2190436 | 5/1997 |
| EP | 0 314 166 A1 | 5/1989 |
| EP | 0 314 166 B1 | 5/1989 |
| EP | 0 337 695 A3 | 10/1989 |
| EP | 0 337 695 A2 | 10/1989 |
| EP | 0 567 835 A1 | 3/1993 |
| EP | 0 526 975 A2 | 10/1993 |
| EP | 0 486 463 B1 | 10/1996 |
| EP | 0 774 496 A1 | 5/1997 |
| EP | 0 791 636 A1 | 8/1997 |
| EP | 730 015 B1 | 1/1999 |
| FR | 2 682 389 | 4/1993 |
| GB | 2 018 621 A | 10/1979 |
| GB | 2 089 826 A | 6/1982 |
| WO | WO 92/19656 | 11/1992 |
| WO | WO 93/05875 | 4/1993 |
| WO | WO 95/02835 | 1/1995 |
| WO | WO 96/3157 | 10/1996 |
| WO | WO 96/36669 | 11/1996 |
| WO | WO 99/38034 | 7/1999 |
| WO | WO 99/57205 | 11/1999 |
| WO | WO 99/57375 | 11/1999 |
| WO | WO 00/27892 | 5/2000 |
| WO | WO 00/58024 | 10/2000 |

OTHER PUBLICATIONS

Bacsa et al., Rutile Formation in Hydrothermally Crystallized Nanosized Titania, Communications of the American Ceramic Society, vol. 79, 8, pp. 2185–2188 (1996).

Product Information, Bayer, Trial Product AI 4071.

Michael Beyer et al., "Pretty and Durable: Protective and Cover Films Made of Polyamides," ("Schon und Robust: Schutz– und Dekorfolien aus Polyamiden") Sports and Leisure Time (Sport und Freizeit), pp. 98–101. (with English translation).

Kondo et al., "Crystallization Behavior and Microstructure of Hydrothermally Treated Monodispered Titanium Dioxide Particles," Journal of the Ceramic Society of Japan, 102 [8], pp. 742–746 (1994).

(List continued on next page.)

*Primary Examiner*—Robert Dawson
*Assistant Examiner*—Christopher M. Keehan
(74) *Attorney, Agent, or Firm*—Lisa M. Fagan

(57) ABSTRACT

A sporting goods article with a coating on a surface of the article for abrasion resistance and/or a high gloss appearance. The outer layer of the surface is a polymer, wood, metal, non-polymeric ink, non-polymeric colorant, non-polymeric dye, or a combination thereof The coating is a cured ceramer composition. The cured ceramer composition, in its simplest embodiment, is derived from a composition including inorganic oxide particles and a curable organic matrix, with the curable organic matrix including at least one ethylenically unsaturated monomer and at least one organofunctional silane monomer coupling agent.

59 Claims, No Drawings

OTHER PUBLICATIONS

Oliveira et al., "Generation of wet–chemical AR–coatings on plastic substrates by use of polymerizable nanoparticles," SPIE, vol. 3136, pp. 452–461.

Product Bulletin, Nalco® 2327, "Colloidal Silicon Dioxide" (1989).

Yoshida, et al., "Tio$_2$ nano–particle–dispersed polyimide composite optical waveguide materials through reverse micelles", Journal of Materials of Science, 32, pp. 4047–4051 (1997).

So et al., "Phase Transformation Behavior at Low Temperature in Hydrothermal Treatment of Stable and Unstable Titania Sol," Journal of Colloid and Interface Science, 191, pp. 398–406 (1997).

Product Information, Union Carbide® Organofunctional Silanes Products and Applications.

Product Information, Union Carbide® Organofunctional Silanes for Coatings.

Product information, Clariant, Highlink® OG Silicon Organosols, 7 pages.

1998 Annual Report for Fraunhofer Institut Silicatforschung, information on ORMOCER®s, pp. 26–29, 38 etc.

SPORTING GOODS HAVING A CERAMER COATING

TECHNICAL FIELD

This invention relates to sporting goods articles that are coated for abrasion resistance or for both abrasion resistance and a high gloss appearance. More specifically, the invention relates to sporting goods article comprising a substrate, and a coating provided on at least a portion of a surface of said substrate, wherein said portion of said surface of said substrate has at least an outer layer comprising a material selected from the group consisting of polymers, woods, metals, non-polymeric inks, non-polymeric colorants, non-polymeric dyes, and combinations thereof, wherein said coating comprises a cured ceramer composition that is derived from ingredients comprising inorganic oxide particles and a curable organic matrix, and wherein said curable organic matrix comprises at least one ethylenically unsaturated monomer and at least one organofunctional silane monomer coupling agent.

BACKGROUND

Sporting goods, by virtue of their use, are subject to rough treatment. For instance, sporting goods are subject to abrasion from many different sources. In order to maintain the high performance and appearance of such sporting goods, it is desirable to protect them from damage by abrasion. In addition, it is desirable to protect the graphics, or their appearance, on such sporting goods from abrasion.

To protect the surfaces of other articles from abrasion and scratching, a ceramer layer has been coated onto one or more portions of the surfaces of such articles. One particularly excellent ceramer composition is described in WO 99/38034 (Bilkadi et al.).

Ceramers have been used on articles for abrasion resistance and/or a high gloss appearance. Some examples include traffic signs, pavement markers, lenses for glasses, and microwave oven doors.

Currently, some sporting goods are coated with materials, other than ceramers, to protect their surfaces from abrasion. For example, the outer surface of some skis are protected with a polyamide or polyester polymeric layer. Sporting goods can also be coated with lacquers, which enhance their appearance and offer some protection. However, the coatings currently used on sporting goods do not perform as necessary to resist most types of abrasion normally observed under normal usage.

SUMMARY OF INVENTION

The present inventors have recognized a need for a coating on sporting goods articles that will effectively protect the articles from abrasion, and additionally, if desired, provide a high gloss appearance. The present invention is a sporting goods article including a coating that provides effective abrasion resistance and a high gloss appearance if desired. The coating may also may protect graphics that are part of the sporting goods article.

The present invention relates to, in its simplest embodiment, a sporting goods article comprising a substrate, and a coating provided on at least a portion of a surface of said substrate, wherein said portion of said surface of said substrate has at least an outer layer comprising a material selected from the group consisting of polymers, woods, metals, non-polymeric inks, non-polymeric colorants, non-polymeric dyes, and combinations thereof, wherein said coating comprises a cured ceramer composition that is derived from ingredients comprising inorganic oxide particles and a curable organic matrix, and wherein said curable organic matrix comprises at least one ethylenically unsaturated monomer and at least one organofunctional silane monomer coupling agent.

The coating of said cured ceramer composition is effective to improve the abrasion resistance of said portion of said surface of said substrate that is coated with said cured ceramer composition. In addition, said coating is effective to enhance the gloss of said portion of said surface of said substrate.

The inorganic oxide particles may comprise silica particles. The particles may also comprise particles selected from the group consisting of silica, titania, zirconia, ceria, antimony, and combinations thereof.

The organofunctional silane monomer coupling agent may comprise a hydrolyzable organofunctional silane.

The ethylenically unsaturated monomer may comprise at least one multifunctional unsaturated monomer. Alternatively, there may be another, or second, ethylenically unsaturated monomer that may be at least one monofunctional ethylenically unsaturated monomer.

The most preferred cured ceramer composition is derived from the following ingredients: pentaeryritol triacrylate (the multifunctional ethylenically unsaturated monomer), N-vinyl caprolactam (the monofunctional ethylenically unsaturated monomer), (meth)acryloxypropyl methoxysilane (the coupling agent), and silica (inorganic oxides particles).

The thickness of the coating of the cured ceramer composition is not limited, except that it must be thick enough to be effective in resisting abrasion, for example. The thickness of the coating is, however, preferably about 1 to about 40 microns, and most preferably about 2 to about 10 microns.

Another embodiment is a sporting goods article comprising a substrate, and a coating provided on at least a portion of a surface of said substrate, wherein said portion of said surface of said substrate has at least an outer layer comprising a material selected from the group consisting of polymers, woods, metals, non-polymeric inks, non-polymeric colorants, non-polymeric dyes, and combinations thereof, wherein said coating comprises a cured ceramer composition that is derived from ingredients comprising inorganic oxide particles and a curable organic matrix, and wherein said curable organic matrix comprises at least one multifunctional ethylenically unsaturated monomer, and at least one organofunctional silane monomer coupling agent. The curable organic matrix of the sporting goods article may further comprise at least one monofunctional ethylenically unsaturated monomer.

Another embodiment is a sporting goods article comprising a substrate, graphics, and a coating provided on at least a portion of a surface of said substrate, wherein said portion of said surface of said substrate has at least an outer layer comprising a material selected from the group consisting of polymers, woods, metals, non-polymeric inks, non-polymeric colorants, non-polymeric dyes, wherein said coating comprises a cured ceramer composition that is derived from ingredients comprising inorganic oxide particles and a curable organic matrix, and wherein said curable organic matrix comprises at least one ethylenically unsaturated monomer and at least one organofunctional silane monomer coupling agent.

Yet another embodiment is a ski comprising a substrate having a top surface, and a coating on at least a portion of said top surface, wherein said portion of said top surface of said substrate has at least an outer layer comprising a material selected from the group consisting of polymers, woods, metals, non-polymeric inks, non-polymeric colorants, non-polymeric dyes, and combinations thereof, wherein said coating comprises a cured ceramer composition that is derived from ingredients comprising inorganic oxide particles and a curable organic matrix, and wherein said curable organic matrix comprises at least one ethylenically unsaturated monomer and at least one organofunctional silane monomer coupling agent.

A further embodiment is a golf club comprising a shaft and a head, and a coating provided on at least a portion of a surface of said shaft, wherein said portion of said surface of said shaft has at least an outer layer comprising a material selected from the group consisting of polymers, woods, metals, non-polymeric inks, non-polymeric colorants, non-polymeric dyes, and combinations thereof, wherein said coating comprises a cured ceramer composition that is derived from ingredients comprising inorganic oxide particles and a curable organic matrix, and wherein said curable organic matrix comprises at least one ethylenically unsaturated monomer and at least one organofunctional silane monomer coupling agent.

An additional embodiment is a golf club comprising a shaft and a head, and a coating provided on at least a portion of a surface of said head, wherein said portion of said surface of said head has at least an outer layer comprising a material selected from the group consisting of polymers, woods, metals, non-polymeric inks, non-polymeric colorants, non-polymeric dyes, and combinations thereof, wherein said coating comprises a cured ceramer composition that is derived from ingredients comprising inorganic oxide particles and a curable organic matrix, and wherein said curable organic matrix comprises at least one ethylenically unsaturated monomer and at least one organofunctional silane monomer coupling agent.

Yet another additional embodiment is a ski boot comprising an outer shell, and a coating provided on at least a portion of a surface of said outer shell, wherein said portion of said surface of said outer shell has at least an outer layer comprising a material selected from the group consisting of polymers, non-polymeric inks, non-polymeric colorants, non-polymeric dyes, and combinations thereof, wherein said coating comprises a cured ceramer composition that is derived from ingredients comprising inorganic oxide particles and a curable organic matrix, and wherein said curable organic matrix comprises at least one ethylenically unsaturated monomer and at least one organofunctional silane monomer coupling agent.

Another embodiment is a helmet comprising an outer shell, and a coating provided on at least a portion of a surface of said outer shell, wherein said portion of said surface of said outer shell has at least an outer layer of a material selected from the group consisting of polymers, non-polymeric inks, non-polymeric colorants, non-polymeric dyes, and combinations thereof, wherein said coating comprises a cured ceramer composition that is derived from ingredients comprising inorganic oxide particles and a curable organic matrix, and wherein said curable organic matrix comprises at least one ethylenically unsaturated monomer and at least one organofunctional silane monomer coupling agent.

In this application:

"Ceramer," "cured ceramer composition" or "inorganic/organic composite" mean a coated dispersion comprising substantially non-aggregated, colloidal inorganic oxide particles dispersed in a cured organic binder or matrix composition, wherein the binder being cured is understood to mean in a broad sense the solidification (hardening) of the binder brought about by a suitable approach such as cooling of a molten thermoplastic material, drying of a solvent-containing composition, chemical cross-linking of a thermosetting composition, radiation curing of a radiation curable composition, or the like;

"Curable" means that a coatable material can be transformed into a solid, substantially non-flowing material by means of radiation cross-linking, or the like;

"Cured" means a coatable material has been transformed into a solid, substantially non-flowing material by means of heat, ultraviolet radiation, electron beam radiation, or the like;

"Gloss" refers to shininess or luster of a surface;

"Graphics" refers to text, letters, pictures, drawings, logos, insignias, trademarks, service marks and the like, that comprise polymers, non-polymeric inks, non-polymeric colorants, non-polymeric dyes, or combinations thereof, or the like, and that are used to decorate or identify the articles that they are attached to, adhered to, embedded in or placed on;

"Helmet" refers to a head covering of a hard material designed to protect the head;

"Ski" refers to one (which could be one of a pair of skis) long, relatively flat runner of wood, metal, polymer, or combinations thereof, of varying length that curves upward in front and may or may not be attached to a boot(s) or shoe(s), or a binding(s) used to attach a boot(s) or a shoe(s), for gliding or traveling over snow or water; and is meant to include alpine (otherwise known as "downhill" or "slalom") skis, water skis, cross-country skis, snowboards and the like;

"Ski boot" refers to a piece of foot gear covering the foot and part of the leg, which may be attached to a ski and used for skiing (including downhill skiing (otherwise known as "alpine" or "slalom"), and cross-country skiing and the like); and "Sporting goods articles" refers to articles that are used in or are appropriate for sports.

DETAILED DESCRIPTION

The embodiments of the present invention described below are not intended to be exhaustive or to limit the invention to the precise forms disclosed in the following detailed description. Rather the embodiments are chosen and described so that others skilled in the art may appreciate and understand the principles and practices of the present invention. The present invention relates to coating sporting goods articles with a ceramer to protect them from abrasion. The ceramer also provides a high gloss appearance if desired. In its simplest embodiment, the present invention is a sporting goods article comprising a substrate, and a coating provided on at least a portion of a surface of said substrate, wherein said portion of said surface of said substrate has at least an outer layer comprising a material selected from the group consisting of polymers, woods, metals, non-polymeric inks, non-polymeric colorants, non-polymeric dyes, and combinations thereof, wherein said coating comprises a cured ceramer composition that is derived from ingredients comprising inorganic oxide particles and a curable organic matrix, and wherein said curable organic matrix comprises at least one ethylenically unsaturated monomer and at least one organofunctional silane monomer coupling agent.

Sporting Goods Article

The sporting goods article of the present invention comprises a substrate wherein at least a portion of a surface of said sporting goods article has an outer layer comprising a material selected from the group consisting of polymers, woods, metals, non-polymeric inks, non-polymeric colorants, non-polymeric dyes, and combinations thereof. The sporting goods article also comprises a coating of a cured ceramer composition on said outer layer of said portion of said substrate, said layer of cured ceramer composition being effective to improve the abrasion resistance of said surface of the sporting goods article and may additionally be effective to enhance the gloss of the portion of the surface of the article that is coated. One, or more than one, surface on the sporting goods article may be coated. The surface of the sporting goods article can be completely coated, or just a portion of the surface can be coated with said layer of the cured ceramer composition.

The cured ceramer composition adheres to substrates such as polymers, metals, and woods. Polymers include paints, inks, dyes and colorants. In addition, the cured ceramer composition adheres to non-polymeric inks, non-polymeric dyes and non-polymeric colorants. The polymers, non-polymeric inks, non-polymeric dyes and non-polymeric colorants may comprise the graphics that may be part of some sporting goods articles. The curable ceramer composition may also be applied to leather, printed surfaces, and textiles for abrasion resistance.

Some examples of sporting goods articles of the present invention include, but are not limited to, skis (which include alpine (otherwise known as "downhill" or "slalom") skis, cross-country skis, water skis and snowboards), skis poles, ski boots, ski bindings, helmets, golf clubs, baseball bats, ropes, surf boards, athletic shoes and arrows. The sporting goods articles listed herein are not, however, an exhaustive list of the sporting goods articles of the present invention. Any sporting goods article that has at least one surface with an outer portion comprising polymers, metals, woods, non-polymeric inks, non-polymeric colorants, non-polymeric dyes, leather, textiles or combinations thereof, is included in the present invention.

Only certain surfaces of the sporting goods articles may be desired to be coated. For example, just the shaft of a golf club may be coated, or just the head of the golf club. It may be desirable, however, to coat both the head and the shaft of the golf club. In addition, only certain portions of the surface may be desired to be coated by a cured ceramer composition.

The sporting goods articles of the present invention may include graphics, which are discussed in more detail below.

Ceramer Composition

The cured ceramer composition of the present invention is derived from ingredients comprising an organic matrix and inorganic oxide particles. The cured ceramer composition has inorganic particles dispersed within the organic matrix.

The organic matrix can include a variety of monomers, oligomers, and/or polymers that form the cured matrix for the inorganic oxide particles. The organic matrix may comprise at least one ethylenically unsaturated monomer and at least one organofunctional silane monomer coupling agent. Optional initiators, photosensitizers and additives may also further comprise the curable composition from which the cured organic matrix of the cured ceramer composition is derived, which are discussed in more detail below.

The cured ceramer composition also includes inorganic oxide particles, which are also discussed in more detail below.

Ethylenically Unsaturated Monomer

The organic matrix comprises at least one ethylenically unsaturated monomer and at least one coupling agent. The ethylenically unsaturated monomer(s) of the organic matrix may be at least one multifunctional ethylenically unsaturated monomer, or a combination of at least one multifunctional ethylenically unsaturated monomer and at least one monofunctional ethylenically unsaturated monomer.

The multifunctional ethylenically unsaturated monomer may be an ester of (meth)acrylic acid. It is more preferably selected from a group consisting of a difunctional ethylenically unsaturated ester of acrylic or methacrylic acid, a trifunctional ethylenically unsaturated ester of acrylic or methacrylic acid, a tetrafunctional ethylenically unsaturated ester of acrylic or methacrylic acid, and combinations thereof. Of these, trifunctional and tetrafunctional ethylenically unsaturated esters of (meth)acrylic acid are more preferred.

Preferred multifunctional ethylenically unsaturated esters of (meth)acrylic acid can be described by the formula:

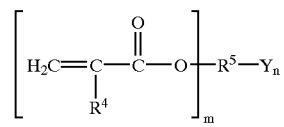

wherein $R^4$ is hydrogen, halogen or a $(C_1-C_4)$alkyl group (preferably $R^4$ is hydrogen or a methyl group); $R^5$ is a polyvalent organic group, which can be: a cyclic, branched, or linear aliphatic moiety; a cyclic, branched or linear heteroaliphatic moiety; an aromatic moiety; or a heteroaromatic moiety; Y is hydrogen, $(C_1-C_4)$alkyl, or a protic functional group; m is an integer designating the number of acrylic or methacrylic groups in the ester and has a value of at least 2; and n has a value of the valence of R5 minus the value of m. Referring to this formula, preferably, $R^5$ has a molecular weight of about 12–100, m has a value of 2–6 (more preferably m has a value of 2–5, most preferably m has a value of 3–4, or where a mixture of multifunctional acrylates and/or methacrylates are used, m has an average value of about 2.05–5), and n is an integer having a value of 1 to 3. Preferred protic functional groups are selected from the group consisting of —OH, —COOH, —SH, —PO(OH)$_2$, —SO$_3$H and —SO(OH)$_2$.

Examples of suitable multifunctional ethylenically unsaturated esters of (meth)acrylic acid are the polyacrylic acid or polymethacrylic acid esters of polyhydric alcohols including, for example, the diacrylic acid and dimethylacrylic acid ester of aliphatic diols such as ethyleneglycol, triethyleneglycol, 2,2-dimethyl-1,3-propanediol, 1,3-cyclopentanediol, 1-ethoxy-2,3-propanediol, 2-methyl-2,4-pentanediol, 1,4-cyclohexanediol, 1,6-hexamethylenediol, 1,2-cyclohexanediol, 1,6-cyclohexanedimethanol; the triacrylic acid and trimethacrylic acid esters of aliphatic triols such as glycerin, 1,2,3-propanetrimethanol, 1,2,4-butanetriol, 1,2,5-pentanetriol, 1,3,6,-hexanetriol, and 1,5,10-decanetriol; the triacrylic acid and trimethacrylic acid esters of tris(hydroxyethyl) isocyanurate; the tetraacrylic and tetramethacrylic acid esters of aliphatic triols, such as 1,2,3,4-butanetetraol, 1,1,2,2-tetramethylolethane, 1,1,3,3-tetramethylolpropane, and pentaerythritol tetraacrylate; the pentaacrylic acid and pentamethacrylic acid esters of aliphatic pentol such as adonitol; the hexaacrylic acid and hexamethacrylic acid esters of hexanols such as sorbitol and dipentaerythritol; the diacrylic acid and dimethacrylic acid esters of aromatic diols such as resorcinol, pyrocatecol, bisphenol A, and bis(2-hydroxyethyl) phthalate; the trimethacrylic acid ester of aromatic triols such as pyrogallol, phloroglucinol, and 2-phenyl-2,2-methylolethanol; and the hexaacrylic acid and hexamethacrylic acid esters of dihydroxy ethyl hydantoin; and mixtures thereof. Other examples include, but are not limited to, poly-ethoxylated or - propoxylated di-(meth)acrylate (that is, poly(ethylene/ propylene oxide) di-(meth)acrylate) macromers (that is, macromolecular monomers).

Preferably, the multifunctional ethylenically unsaturated ester of (meth)acrylic acid is a nonpolyetheral multifunctional ethylenically unsaturated ester of (meth)acrylic acid. More preferably, the multifunctional ethylenically unsaturated ester of (meth)acrylic acid is selected from the group consisting of pentaerythritol triacrylate (PETA), pentaerythritol trimethacrylate, and a combination thereof. Most preferably, the multifunctional ethylenically unsaturated ester of (meth)acrylic acid is pentaerythritol triacrylate.

In addition to the multifunctional ethylenically unsaturated esters of acrylic acid, the curable composition, from which the cured organic matrix is derived, may include at least one monofunctional ethylenically unsaturated monomer. The monofunctional ethylenically unsaturated monomer may be a monofunctional ethylenically unsaturated ester of (meth)acrylic acid (that is, an alkyl and/or aryl acrylate or methacrylate). Preferably, the alkyl group of the (meth)acrylate has about 4 to 14 carbon atoms (on average). The alkyl group can optionally contain oxygen atoms in the chain thereby forming ethers, for example. Preferably, the aryl group of the (meth)acrylate has about 6 to about 20 carbon atoms (on average).

The monofunctional ethylenically unsaturated monomer may be selected from a group consisting of a monofunctional (meth)acrylic acid ester, a (meth)acrylamide, an alpha-olefin, a vinyl ether, a vinyl ester, a vinyl amide and combinations thereof.

The monofunctional acrylate monomer may be an N,N-disubstituted (meth)acrylamide monomer or an N-substituted-N-vinyl-amide.

Further examples include, but are not limited to, 2-hydroxyethyl acrylate, 2-hydroxymethylacrylate, 2-methylbutyl acrylate, isooctyl acrylate, lauryl acrylate, 4-methyl-2-pentyl acrylate, isoamyl acrylate, sec-butyl acrylate, n-butyl acrylate, n-hexyl acrylate, 2-ethylhexyl acrylate, n-octyl acrylate, n-decyl acrylate, isodecyl acrylate, isodecyl methacrylate, and isononyl acrylate. Other examples include, but are not limited to, poly-ethoxylated or - propoxylated methoxy (meth)acrylate (that is, poly (ethylene/propylene oxide) mono-(meth)acrylate) macromers (that is, macromolecular monomers), polymethylvinyl ether mono(meth)acrylate macromers, and ethoxylated or propoxylated nonyl-phenol acrylate macromers. The molecular weight of such macromers (that is, macromolecular monomers) is typically about 100 grams/mole to about 600 grams/mole, and preferably, about 300 grams/mole to about 600 grams/mole. Preferred monofunctional (meth) acrylates that can be used include 2-methylbutyl acrylate, isooctyl acrylate, lauryl acrylate, and methoxy-capped poly (ethylene glycol) mono-methacrylate.

The monofunctional ethylenically unsaturated monomer may also be selected from the group of a (meth)acrylamide, an alpha-olefin, a vinyl ether, a vinyl ester, a vinyl amide and a combination thereof Examples include, but are not limited to, acrylamides, such as acrylamide, methacrylamide, N-methyl acrylamide, N-ethyl acrylamide, N-methylol acrylamide, N-hydroxyethyl acrylamide, diacetone acrylamide, N,N-dimethyl acrylamide, N,N-diethyl acrylamide, N-ethyl-N-aminoethyl acrylamide, N-ethyl-N-hydroxyethyl acrylamide, N,N-dimethylol acrylamide, N,N-dihydroxyethyl acrylamide, t-butyl acrylamide, dimethylaminoethyl acrylamide, N-octyl acrylamide (normal and branched), and 1,1,3,3-tetramethylbutyl acrylamide. Other examples include acrylic acid, methacrylic acid, itaconic acid, crotonic acid, maliec acid, fuimaric acid, 2,2'-(ethoxyethoxy)ethyl acrylate, 2-hydroxyethyl acrylate or methacrylate, 2-hydroxypropyl acrylate or methacrylate, 3-hydroxypropyl acrylate or methacrylate, t-butyl acrylate, n-butyl methacrylate, isobornyl acrylate, 2-(phenoxy)ethyl acrylate or methacrylate, biphenylyl acrylate, t-butylphenyl acrylate, cyclohexyl acrylate, dimethyladamantyl acrylate, 2-naphthyl acrylate, phenyl acrylate, N-vinyl pyrrolidone, and N-vinyl caprolactam. Preferred monofunctional acrylic monomers include acrylic acid, t-butyl acrylate, N,N-dimethyl acrylamide, 1,1,3,3-tetramethylbutyl acrylamide, N-octyl acrylamide, 2-(phenoxy) ethyl acrylate, 2-hydroxypropyl acrylate, 3-hydroxypropyl acrylate, isobronyl acrylate, and 2-(phenoxy)ethyl acrylate. A particularly preferred monofunctional unsaturated monomer is N-vinyl caprolactam (NVC).

In general, the acrylamide compounds have the following formula:

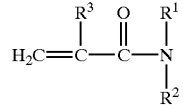

wherein: $R_1$ and $R^2$ are each independently hydrogen, a $(C_1-C_8)$alkyl group optionally having hydroxy, halide, carbonyl, and amido functionalities, a $(C_1-C_8)$alkylene group optionally having carbonyl and amido functionalities, a $(C_1-C_4)$alkoxymethyl group, a $(C_4-C_{18})$aryl group, a $(C_1-C_3)$alk$(C_4-C_{18})$aryl group, and a $(C_4-C_{18})$heteroaryl group; with the proviso that only one of $R^1$ and $R^2$ is hydrogen; and $R^3$ is hydrogen, a halogen, or a methyl group. Preferably, $R^1$ is a $(C_1-C_4)$alkyl group; $R^2$ is a $(C_1-C_4)$ alkyl group; and $R^3$ is hydrogen, a halogen, or a methyl group. $R^1$ and $R^2$ can be the same or different. More preferably, each of $R^1$ and $R^2$ is $CH_3$, and $R^3$ is hydrogen.

Examples of suitable (meth)acrylamides are N-(3-bromopropionamidomethyl)acrylamide, N-tert-butylacrylamide, N,N-dimethylacrylamide, N,N-diethylacrylamide, N-(5,5-dimethylhexyl)acrylamide, N-(1,1-dimethyl-3-oxobutyl)acrylamide, N-(hydroxymethyl) acrylamide, N-(isobutoxymethyl)acrylamide, N-isopropylacrylamide, N-methylacrylamide, N-ethylacrylamide, N-methyl-M-ethylacrylamide, N-(fluoren-2-yl)acrylamide, N-(2-fluorenyl)-2-methylacrylamide, 2,3-bis(2-furyl)acrylamide, N,N'-methylene-bis acrylamide. A particularly preferred acrylamide is N,N-dimethyl acrylamide.

Organofunctional Silane Monomer Coupling Agent

The curable organic matrix composition, in addition to at least one ethylenically unsaturated monomer, comprises an organofunctional silane monomer coupling agent. A wide variety of organofunctional silane monomers may be used in the practice of the present invention. The preferred organofunctional silanes are hydrolyzable organofunctional silanes, also known in the art as "coupling agents" for coupling silica particles to organic materials. Representative examples include methyl trimethoxysilane, methyl triethoxysilane, phenyl trimethoxysilane, phenyl triethoxysilane, (meth) acryloxyalkyl trimethoxysilanes, such as methacryloxypropyl trimethoxysilane, (meth)acryloxypropyl trichlorosilane, phenyl trichlorosilane, vinyl trimethoxysilane, vinyl triethoxysilane, propyl trimethoxysilane, propyl triethoxysilane, glycidoxypropyl trimethoxysilane, glycidoxypropyl triethoxysilane, glycidoxypropyl trichlorosilane, perfluoroalkyl trimethoxysilane, perfluoroalkyl triethoxysilane, perfluoromethylalkyl trimethoxysilanes, such as tridecafluoro-1,1,2,2-tetrahydrooctyl trimethoxysilane, perfluoroalkyl trichlorosilanes, trifluoromethylpropyl trimethoxysilane, trifluoromethylpropyl trichlorosilane, and perfluorinated sulfonimido ethyl trimethoxysilane (available from the Minnesota Mining and Manufacturing Company, St. Paul, Minn., under the trade designation FC 405), combinations of these, and the like. Most preferably, the organofunctional silane monomer is (meth)acryloxypropyl trimethoxysilane.

Optionally, the inorganic oxide particles may be surface treated with a silane coupling agent and, in such embodiments, the coupling agent may be the same or different from the silane monomers used to form the bulk of the organic binder of the ceramer composition.

Inorganic Oxide Particles

In the present invention, the cured ceramer composition also includes inorganic oxide particles. The inorganic oxide particles are dispersed within the cured organic matrix. The preferred inorganic oxide particles are silica, however others may be used.

Silica sols useful for preparing ceramer compositions can be prepared by methods well known in the art. As used herein, "sol" shall refer to a colloidal dispersion of substantially non-aggregated, inorganic oxide particles in a liquid medium. Colloidal silicas dispersed as sols in aqueous solutions are also available commercially under such trade names as LUDOX (E.I. DuPont de Nemours and Co., Wilmington, Del.), NYACOL (Nyacol Co., Ashland, Mass.), and NALCO 2327 and 1042 (Nalco Chemical Co., Oak Brook, Ill.). Nonaqueous silica sols (also called silica organosols) are also commercially available under the trade names NALCO 1057 (a silica sol in 2-propoxyethanol, Nalco Chemical Co.), MA-ST, IP-ST, and EG-ST (Nissan Chemical Ind., Tokyo, Japan) and HIGHLINK OG Silica Organosols (Clariant Corporation, Charlotte, N.C.). The silica particles preferably have an average particle diameter of about 5 nm to about 1000 nm, and more preferably, about 10 nm to about 50 nm. Average particle size can be measured using transmission electron microscopy or light scattering techniques to count the number of particles of a given diameter. Additional examples of suitable colloidal silicas are described in U.S. Pat. No. 5,126,394 (Bilkadi).

Preferably, the silica particles are functionalized with a coupling agent. More preferably, the silica particles are (meth)acrylate functionalized. Herein "(meth)acrylate functionalized" means the silica particles are functionalized with a (meth)acrylate terminated organofunctional silane. The functionalized particles bond intimately and isotropically with the organic matrix. Typically, the silica particles are functionalized by adding a (meth)acrylate functionalized silane to aqueous colloidal silica. Examples of (meth) acrylate functionalized colloidal silica are described in U.S. Pat. Nos. 4,491,508 (Olsen et al.), 4,455,205 (Olsen et al.), 4,478,876 (Chung), 4,486,504 (Chung), and 5,258,225 (Katsamberis).

In addition to silica, or in place of silica, the colloidal inorganic particles may be colloidal articles of higher refractive index than silica. Examples of such higher index colloidal particles include, but are not limited to, alumina, titania, zirconia, ceria, and antimony oxide sols, all of which are available commercially from suppliers such as Nyacol Co., Ashland, Mass., and Nalco Chemical Co., Oak Brook, Ill.

It is highly desirable that the colloidal inorganic particles of the coating be derived from a sol rather than a powder, which can result in an intractable mass that is unsuitable for coating. The addition of additives, such as high molecular weight polymers, may enable compositions derived from colloidal powder to be cast onto inorganic polymeric substrates. However, it is believed that the use of compositions containing colloidal powder will result in coatings having relatively poor optical transparency and poor flow properties for coating. Therefore, the use of colloidal powders is not preferable in the coatings of the present invention. The colloidal silica particles are employed in the coating at 10% to 50% by weight, and more preferably, at 25% to 40% by weight, and most preferably, at 30% to 33% by weight.

A cured ceramer composition of the present invention preferably includes a cured organic matrix and colloidal inorganic particles that at least include silica. Preferably, the cured organic matrix is prepared from a curable organic binder, or curable composition, that includes an ethylenically unsaturated monomer selected from the group of at least one multifunctional ethylenically unsaturated ester of (meth)acrylic acid, optionally at least one monofunctional ethylenically unsaturated monomer (for example, an ester or amide), and combinations thereof, and at least one organofunctional silane coupling agent.

The ceramer composition preferably includes no greater than about 80 percent by weight (wt. %) of at least one ethylenically unsaturated monomer and at least about 20 wt. % colloidal inorganic oxide particles, based on the total weight of the ceramer composition. Preferably, it includes at least about 40 wt. % of at least one ethylenically unsaturated monomer, and no greater than about 60 wt. % of colloidal inorganic oxide particles.

If the ethylenically unsaturated monomers used include a mixture of multifunctional and monofunctional ethylenically unsaturated monomers, the multifunctional monomer is preferably used in an amount of at least about 20 wt. %, and the monofunctional monomer is preferably used in an amount of at least about 5 wt. %. Preferably, the multifunctional monomer is used in an amount of no greater than about 60 wt. %, and the monofunctional monomer is used in an amount of no greater than about 20 wt. %.

If used, an organofunctional silane coupling agent is preferably used in an amount of no greater than about 80 wt. %, more preferably, no greater than about 70 wt. %, and most preferably, no greater than about 60 wt. %, based on the total weight of the ceramer composition. It is preferably used in an amount of at least about 5 wt. %, more preferably, at least about 10 wt. %, and most preferably, at least about 15 wt. %, based on the total weight of the ceramer composition.

It is the combination of the organic matrix with the colloidal inorganic oxide particles (with a coupling agent) that results in unexpected and improved properties as an abrasion resistant coating for sporting goods. The multifunctional ethylenically unsaturated esters of(meth)-acrylic acid tend to increase the hardness of the coating, whereas the monofunctional ethylenically unsaturated monomer tends to "toughen" the coating without significant loss in abrasion resistance. Along with the toughness property, it is also a flexible coating.

In many instances, the abrasion resistant coating can adhere directly to the polymeric substrate without the need for an additional primer or adhesion promoter, which is advantageous at least because this results in a labor and material savings.

Optional Initiators and Photosensitizers

During the manufacture of abrasion resistant coatings, the uncured ceramer composition can be exposed to an energy source, for example, heat or ultraviolet (UV) radiation or electron beam (e-beam) radiation, which initiates a curing process of the curable composition. This curing process typically occurs via a free radical mechanism, which can require the use of a free radical initiator (simply referred to herein as an initiator, for example, a photoinitiator or a thermal initiator). If the energy source is an electron beam, the electron beam generates free radicals and no initiator is required. When the initiator is exposed to one of these energy sources, the initiator generates free radicals, which then initiates the polymerization and cross-linking.

Examples of suitable free radical thermal initiators include, but are not limited to, peroxides such as benzoyl peroxide, azo compounds, benzophenones, and quinones. Examples of photoinitiators that generate a free radical source when exposed to visible light radiation include, but are not limited to, benzophenones. Examples of photoinitiators that generate a free radical source when exposed to ultraviolet light include, but are not limited to, organic peroxides, azo compounds, quinines, benzophenones, nitroso compounds, acryl halides, hydrozones, mercapto compounds, pyrylium compounds, triacrylimidazoles, bisimidazoles, chloroalkyltriazines, benzoin, benzoin methyl ether, benzoin ethyl ether, benzoin isopropyl ether, benzoin isobutyl ethers and methylbenzoin, diketones such as benzil and diacetyl, phenones such as acetophenone, 2,2,2-tri-bromo-1-phenylethanone, 2,2-diethoxyacetophenone, 2,2-dimethoxy-2-phenylacetophenone, 2,2,2-tribromo-1(2-nitrophenyl) ethanone, benzophenone, and 4,4-bis(dimethylamino-benzophenone. Examples of commercially available ultraviolet photoinitiators include those available under the trade designations IRGACURE 184 (1-hydroxycyclohexyl phenyl ketone), IRGACURE 361 and DAROCUR 1173 (2-hydroxy-2-methyl-1-phenyl-propan-1-one) from Ciba-Geigy, Hawthorn, N.Y. Typically, if used, an amount of an initiator is included in the precursor composition to effect the desired level and rate of cure. Preferably, the initiator is used in an amount of about 0.1 wt. % to about 10 wt. %, and more preferably about 2 wt. % to about 4 wt. %, based on the total weight of the curable composition without solvent. It should be understood that combinations of different initiators can be used if desired.

In addition to the initiator, the curable composition of the present invention can include a photosensitizer. The photosensitizer aids in the formation of free radicals that initiate curing of the precursor composition, especially in an air atmosphere. Suitable photosensitizers include, but are not limited to, aromatic ketones and tertiary amines. Suitable aromatic ketones include, but are not limited to, benzophenone, acetophenone, benzil, benzaldehyde, and o-chlorobenzaldehyde, xanthone, tioxanthone, 9,10-anthraquinone, and many other aromatic ketones. Suitable tertiary amines include, but are not limited to, methyldiethanolamine, ethyldiethanolamine, triethanolamine, phenylmethyl-ethanolamine, dimethylaminoethylbenzoate, and the like. Typically, if used, an amount of initiator is included in the precursor compositions to effect the desired level and rate of cure. Preferably, the amount of photosensitizer used in the compositions of the present invention is about 0.01 wt. % to about 10 wt. %, more preferably about 0.05 wt. % to about 5 wt. %, and most preferably, about 0.25 wt. % to about 3 wt. %, based on the total weight of the ceramer composition (that is, the abrasion resistant precursor composition without solvent). It should be understood that combinations of different photosensitizers can be used if desired.

The preferred methods of curing include heat, UV and e-beam. However, other methods may be used. If thermal (or heat) curing is used, however, the temperature must not be so high that it will melt the sporting goods article, or substrate.

Optional Solvent

In addition to the other components of the curable ceramer composition, it may further include a solvent or solvents. The curable ceramer composition (or curable composition) may include a solvent or solvents to reduce the viscosity of the curable ceramer composition in order to enhance the ceramer coating characteristics. The appropriate viscosity level depends upon various factors such as the coating thickness, application technique, and the type of substrate material onto which the ceramer composition is applied.

The organic solvent(s) should be selected such that they are compatible with the components in the ceramer composition. As used in this context, "compatible" means that there is minimal phase separation between the solvent and the curable organic binder or matrix of the ceramer composition. Additionally, the solvent or solvents should be selected such that they do not adversely affect the cured coating properties. Furthermore, the solvent(s) should be selected such that they have an appropriate drying rate. That is, the solvent(s) should not dry too slowly, which would slow down the process of making a coated sporting goods article, nor too quickly, which could cause defects such as pin holes or craters in the coating. Examples of suitable solvents include alcohols, preferably the lower alcohols such as isopropyl alcohol, n-butanol, methanol, ethanol, and ketones such as methyl ethyl ketone, glycols, and combinations thereof.

Optional Additives

The ceramer composition can also preferably include a leveling agent to improve the flow or wetting of the curable ceramer composition on the substrate (before it is cured). The leveling agent can be a solvent that is used to adjust the viscosity of the ceramer composition. If the ceramer composition does not properly wet the substrate, this can lead to visual imperfections (for example, pin holes and/or ridges) in the coating. Examples of leveling agents include, but are not limited to, alkoxy terminated polysilicones such as that available under the trade designation DOW 57 (a mixture of dimethyl-, methyl-, and (polyethylene oxide acetate)-capped siloxane) from Dow Corning, Midland, Mich.; and fluorochemical surfactants. The ceramer composition can include an amount of a leveling agent to impart the desired result. Preferably, the leveling agent is present in an amount up to about 3 wt. %, and more preferably, about 0.5 wt. % to about 1 wt. %, based on the total weight of the ceramer composition. It should be understood that combinations of different leveling agents can be used if desired.

Because organofunctional silane monomers are used, it may be desirable in some instances to add about 1 wt. % to about 3 wt. % glacial acetic acid or similar carboxylic acids as a catalyst for hydrolysis of the organofunctional silane.

Polymeric materials are known to degrade by a variety of mechanisms. Common additives that can offset this are known as stabilizers, absorbers, antioxidants, and the like.

The ceramer compositions of the present invention can include one or more of the following: ultraviolet stabilizer, ultraviolet absorber, ozone stabilizer, and thermal stabilizer/antioxidant.

An ultraviolet stabilizer and/or ultraviolet absorber for improving weatherability and reducing the "yellowing" of the abrasion resistant coating with time. An example of an ultraviolet stabilizer includes that available under the trade designation TINUVIN 292 (bis(1,2,2,6,6-pentamethyl-4-piperidinyl)sebacate) and an example of an ultraviolet absorber includes that available under the trade designation TINUVIN 1130 (hydroxyphenyl benzotriazole), both of which are available from Ciba-Geigy. The ceramer composition can include an amount of either an ultraviolet stabilizer and/or an ultraviolet absorber to impart the desired result. Preferably, the ultraviolet stabilizer or absorber is present in an amount up to about 10 wt. %, and more preferably, about 1 wt. % to about 5 wt. %. based on the total weight of the ceramer composition. It should be understood that combinations of different ultraviolet stabilizers and absorbers can be used if desired.

An ozone stabilizer protects against degradation resulting from reaction with ozone. Examples of ozone stabilizers include, but are not limited to, hindered amines such as that available under the trade designation IRGANOX 1010 available from Ciba-Geigy and phenoltriazine commercially available from Aldrich Chemical Company, Inc., Milwaukee, Wis. The ceramer composition can include an amount of an ozone stabilizer to impart the desired result. Preferably, the ozone stabilizer is present in an amount up to about 1 wt. %, more preferably about 0.1 wt. % to about 1.0 wt. %, and most preferably about 0.3 wt. % to about 0.5 wt. %, based on the total weight of the ceramer composition.

A thermal stabilizer/antioxidant reduces the amount of yellowing as a result of weathering. Examples of such materials include, but are not limited to, low melting hindered phenols and trimesters. Specific examples include 2,6-di-tert-butyl-4-methylphenol commercially available under the trade designation ULTRANOX 226 antioxidant from Borg Warner Chemicals, Inc., Parkersburg, N.Y.; octadecyl 3,5-di-tert-butyl-4-hydroxycinnamate commercially available under the trade designations ISONOX 132 antioxidant (Schnectady Chemicals, Inc., Schnectady, N.Y.) or VANOX 1320 antioxidant (Vanderbilt Co., Inc. Norwalk, Conn.). The ceramer composition can include sufficient thermal stabilizer/antioxidant to impart the desired result. Preferably, the thermal stabilizer/antioxidant is present in an amount up to about 3% by weight, and more preferably about 0.5 to about 1%, based on the total weight of the ceramer composition without solvent. It should be understood that combinations of different thermal stabilizers/antioxidants can be used if desired.

Other optional additives to the curable composition, that eventually forms the cured organic matrix after curing, are thermosetting resins. These resins may be used to impart their specific properties to the ceramer composition of the present invention. Such properties may be desired for particular sporting goods articles or portions of sporting goods articles. Some examples of such resins include acrylic, acryl-melamine, acryl-epoxy, acryl-urethane, melamine-alkyld, epoxy, epoxy-phenolic, phenolic or silicone resin. These resins are easy to obtain commercially.

Some other optional additives may be corrosion reducers or friction reducers.

Method of Coating

To make the curable ceramer composition of the invention, which results in the cured ceramer composition after it is cured, all the components are mixed together including the inorganic particles and the organofunctional coupling agent. Certain components may be premixed if that is advantageous.

The mixture is then stripped, e.g., heated under vacuum to remove substantially all of the water. The resultant dried ceramer composition is a clear liquid. It may be preferred to filter the ceramer composition prior to application to a substrate in an effort to remove gel particles or other agglomerated materials.

The ceramer composition is applied to the outer portion of at least one surface of a sporting goods article as a flowable liquid. It is coated on the surface for which it is desired to improve the abrasion resistance. The composition may be applied by many possible methods of application. The method depends upon the nature of the substrate, the viscosity of the ceramer composition and the like. Some possible methods of application include, but are not limited to, spray coating, knife coating, dip coating, flow coating, roll coating and the like. In spray coating, the ceramer is atomized and then applied to the outer surface of the substrate. In dip coating, the substrate is immersed into the ceramer and then the excess coating drips off the substrate. In flow coating, the substrate is held in a vertical position and the ceramer is applied across the top of the substrate. The ceramer then flows down the substrate. In roll coating, the ceramer is applied to the substrate by a roll coater.

The ceramer composition can be applied over the entire surface of the sporting goods article, one surface if there are more than one surface, or a portion of one surface. The coating thickness of the ceramer composition will depend upon the formulation and the amount of solvent. The thickness of the cured ceramer composition is such that the coating is effective in resisting abrasion. Generally, the coating of curable ceramer composition can be most any thickness that is effective. However, the thickness is preferably between 1 and 40 microns, and most preferably between 2 and 10 microns.

It may be desired to apply more than one layer of curable ceramer composition to the substrate. Successive layers of curable ceramer composition may be applied to the outer portion of a surface of a sporting goods article.

After the curable ceramer composition is applied to the substrate, or the outer portion of at least one surface of the sporting goods article, the solvent is evaporated, or flashed off. This can be done by using heat to remove the solvents. The temperature used to remove the solvents depends upon the solvents that were used. It is typically accomplished at a temperature of about 15 to 75 degrees Celsius. The flashing unit used can be a forced-air oven or an infrared heat source, for examples.

The curable ceramer composition should be applied to the substrate in a manner to eliminate or minimize any imperfections. To minimize the formation of such defects, the actual temperature and humidity conditions may be controlled in a clean room environment, or a particle-free, filtered room, for examples. The actual temperature and humidity conditions are dependent upon the chemistry of the ceramer composition.

Once the solvent is removed, if used, the layer of ceramer composition is exposed to an energy source to initiate curing. The ceramer composition is then cured and forms a coating. The preferred methods of curing include electron beam, ultraviolet light and heat. The type of energy source used to cure the ceramer depends upon the chemical composition of the curable ceramer composition. The amount of energy required to cure the curable ceramer composition is also dependent upon the chemistry of the composition, as well as thickness and density of the coating. Electron beam radiation can be used at an energy level of about 0.1 megarad to about 10 megarad (Mrad). Ultraviolet radiation refers to nonparticulate radiation having a wavelength within the range of about 200 to 400 nanometers. Upon curing, that is, polymerizing and/or cross-linking, the ceramer composition is solidified to form a coating.

It is to be understood that the method of application of the curable ceramer composition to the sporting goods article is meant to be an illustration of one process. It is within the scope of this invention to have many variations on the process of application of the ceramer. The Examples below describe in more detail processes that may be used.

Graphics

Another embodiment of the present invention is a sporting goods article comprising a substrate, graphics, and a coating provided on at least a portion of a surface of said substrate, wherein said portion of said surface of said substrate has at least an outer layer comprising a material selected from the group consisting of polymers, woods, metals, non-polymeric inks, non-polymeric colorants, non-polymeric dyes, wherein said coating comprises a cured ceramer composition that is derived from ingredients comprising inorganic oxide particles and a curable organic matrix, and wherein said curable organic matrix comprises at least one ethylenically unsaturated monomer and at least one organofunctional silane monomer coupling agent.

"Graphics," in this application, refers to text, pictures, drawings, logos, insignias, trademarks, service marks and the like, that comprise polymers, non-polymeric inks, non-polymeric colorants, non-polymeric dyes, or combinations thereof, and that are used to decorate or identify the articles that they are attached to, adhered to or placed on.

It is important to protect the visual appearance of the graphics on sporting goods for aesthetic reasons. In addition, the companies that sell the sporting goods want the appearance of the graphics to remain good on the articles as, for example, advertisement for the companies' articles.

The graphics in the present invention may be on the top of the outer portion of the surface of the body of the sporting goods article. The cured ceramer composition may then be used to protect the graphics from abrasion. However, the graphics may also be underneath another layer of polymer or other clear material. If that is the case, then the cured ceramer composition may be used to protect the visual appearance of the graphics at the same time as protecting the outer portion from abrasion, since it is necessary for the outermost layer of polymer or other material of the sporting goods article to maintain its optical clarity to allow the graphics to be seen through the outermost layer of clear polymer or other material.

Advantages

Besides the abrasion resistance of the cured ceramer composition, the cured ceramer composition also offers other advantages. For instance, the cured ceramer composition can result in a higher gloss appearance than the base substrate. This adds to the aesthetics of the sporting goods. The cured ceramer composition also offers optical clarity, which allows the appearance of the graphics under the composition to be unaffected by the cured ceramer layer. The cured ceramer composition also does not require that a primer be applied for it to adhere to the polymers, metals, woods, non-polymeric inks, non-polymeric colorants, non-polymeric dyes, and combinations thereof, on the sporting goods article. The cured ceramer composition used also results in uniform coating of the substrate. In addition, an important advantage of the cured ceramer composition is that it is flexible in a broad range of temperatures. This allows the ceramer coating to be used on areas of sporting goods that need to flex, and on sporting goods that are subject to wide temperature ranges or extremes. Yet another advantage is that the cured ceramer layer is compatible with dyes, inks and colorants, which allows graphics to be incorporated into the sporting goods article.

Objects and advantages of this invention will now be illustrated by the following Examples, but the particular materials and amounts thereof recited in these Examples, as well as other conditions and details, should not be construed to unduly limit this invention.

EXAMPLES

Preparations

Preparation of Curable Composition (A):

78.5 g (0.26 moles) of PETA, (Aldrich Chemical Co.; Milwaukee, Wis.), 31.2 g (0.13 moles) of 3-(trimethoxysilyl)propyl methacrylate (Dow Corning; Midland Mich. product, Z-6030), 19.5 g (0.14 moles) of N-vinylcaprolactam (Aldrich Chemical Co.; Milwaukee, Wis.), 17.5 mg ($8.78 \times 10^{-5}$ moles) of phenothiazine (Aldrich Chemical Co.; Milwaukee, Wis.) and 15.9mg ($7.22 \times 10^{-5}$ moles) of butylated hydroxytoluene (2,6-di-tert-butyl4-methylphenol (Aldrich Chemical Co.; Milwaukee, Wis.). The mixture was stirred for approximately 30 minutes until all reagents were completely dissolved. Upon addition of 312.4 g of NALCO™ 2327 (40% aqueous dispersion of colloidal silica with a pH of 9.3; particle size=20 nm; ammonium stabilized, available from Nalco Chemical Co., Oak Brook, Ill.), the solution became a milky white suspension. The resin flask was sealed and a 24 cm distillation column and 500 mL receiving flask, cooled to −78° C. with a dry ice/acetone bath, were attached. A thermocouple was placed in the reaction mixture to monitor the reaction temperature. Vacuum was slowly applied to the apparatus through the distillation head until reaching a pressure of 10 torr. The temperature of the mixture was slowly increased, causing the distillation of water from the suspension. As the distillation proceeded and the distillation of water was nearly complete the mixture changed from a milky white suspension to an opaque yellow, nearly clear solution. Water distillation ceased from the solution when the mixture reached approximately 50° C. Approximately 195 g of the curable composition product were recovered from the resin flask. The curable composition product was diluted to 50% solids by adding 195 g of isopropyl alcohol. The ensuing mixture is curable composition (A).

Coating Methods

Coating Method 1:

The coating method 1 was done in three steps:

(1) Spray Coating of Curable Composition: To 4 kg of curable composition (A) was added 1.8 kg of n-butanol and 2.2 kg of isopropyl alcohol and n-butanol to yield a 25% mixture of curable composition mixture. This 25% curable composition mixture was charged to the 20 liter tank of a spray coater and sprayed through a SATA LP 90 NZ nozzle fitted with a 0.5 mm orifice. The following pressures were used:

Pot pressure: 12.5 psi

Gun pressure: 46.0 psi

Fan air: 50.0 psi

Atomizing air: 16.0 psi

Sufficient coating was applied to achieve a coating thickness in the range of 7–10 microns.

(2) IR Heating: The freshly spray coated item was placed on a 6.1 meter conveyor belt traveling at 1.2 meters/minute and exposed to IR irradiation in a 3.7 meter oven with three heating stages. The first 1.2 meter long stage was set at 60° C., the second 1.2 meter long stage was set at 82°

C. and the final 1.3 meter long stage was set to 65° C., respectively. These temperatures were recorded at the surface of the conveyor belt. Only minimal cooling of the coated item was allowed prior to the UV curing step.

(3) UV Curing: A UV curing station (2 mercury H lamps, each 118 watts/cm and 15.2 cm long; available from Fusion UV Systems, Inc; Rockville Md.) yielding an output of 750 mJ/cm$^2$ at the conveyor surface, fitted with a conveyor traveling at 3.7 meters/min was used to achieve UV curing of the spray-coated curable composition on the surface of the substrate. The surface temperature of the substrate upon entering the UV curing chamber was 54° C.

Coating Method 2:

To 1 kg of curable composition (A) was added 1 kg of isopropyl alcohol to achieve a 25% solids curable composition mixture. 1.8 kg of the ensuing mixture was charged to a 2000 mL graduated cylinder. The item to be coated was slowly lowered into the mixture in the graduated cylinder and withdrawn. The coated item was vertically suspended in an oven with an internal temperature of 70° C. for a period of 5 minutes. The resulting dried, coated item was then horizontally placed on a cradle which allowed it to be conveniently subjected to UV curing on a conveyor traveling at 7.6 meters/minute (2 UV lamps @ 236 watts/cm each and 22.9 cm long; Fusion UV Systems, Inc, Rockville, Md.). The item was subjected to four passes under the UV curing system, each time being rotated 90 degrees with respect to the long axis of the shaft, to assure complete UV exposure, and thus curing all of the curable composition on the item.

Test Methods

Test Method 1. The surface of the material to be tested was taped off to mark the area to be evaluated. Three initial gloss angles (20°, 60° and 85°) using a glossmeter (ASTM D 523-89) and initial pencil hardness values (PH; ASTM D 3363-92a) were measured. Cross cut adhesion (Cross Cut Adh; ASTM D-3359) measurements were made on treated surfaces. 15 g of 0000 steel wool was placed directly onto the surface of the test item followed by a 1246 g weight of dimensions 7.6 cm×8.9 cm. The weight was manually passed back and forth over the area to be evaluated without applying additional hand pressure to the weight. When the appropriate number of passes were executed, additional gloss and hardness readings are taken. In addition, coating appearance was visually rated using the following scale:

1=extreme abrasion
2=heavy abrasion
3=moderate abrasion
4=slight abrasion
5=no abrasion Test Method 2. Initial gloss angles were measured on the surface of the item using a glossmeter (ASTM D 523-89) and initial pencil hardness values (ASTM D 3363-92a). Approximately 15 g of 0000 steel wool was rubbed with equal pressure over the untreated and treated surface of the test item at medium hand pressure. The resulting surface of the item was visually rated using the following scale:

1=extreme abrasion
2=heavy abrasion
3=moderate abrasion
4=slight abrasion
5=no abrasion Example 1

A hard coat ceramer coating was applied to a PRO-CARV™ 5.20 snow ski (from Atomic, Austria) using curable composition (A) and coating method 1. Test method 1 was used to evaluate the surface coating. The test results listed in Table A show that the ceramer coating exhibits superior visual rating, gloss and pencil hardness values over the untreated substrate. In addition, the cured ceramer coating shows no loss of adhesion to the substrate, as exhibited by the cross cut adhesion values.

Example 2

A hard coat ceramer was applied to an X CARVE™ 3.0 snow ski (from Elan, Begunje, Slovenia) using curable composition (A) and coating method 1. Test method 1 was used to evaluate the surface coating. The test results listed in Table B show that the ceramer coating exhibits superior visual rating, gloss and pencil hardness values over the untreated substrate. In addition, the cured ceramer coating shows no loss of adhesion to the substrate, as exhibited by the high cross cut adhesion values.

Example 3

A hard coat ceramer was applied to an Junior Z-BUBBLE™ hockey stick (from Easton) using curable composition (A), and coating method 1. Test method 1 was used to evaluate the surface coating. The test results listed in Table C show that the ceramer coating exhibits superior visual rating, gloss and pencil hardness values over the untreated substrate. In addition, the cured ceramer coating shows no loss of adhesion to the substrate, as exhibited by the high cross cut adhesion values.

Example 4

A hard coat ceramer was applied to a M49V™ ski binding (from Marker USA, Salt Lake City, Utah) using curable composition (A) and coating method 1. Test method 2 was used to evaluate the surface coating. The test results listed in Table D show that the ceramer coating exhibits superior visual rating, gloss and pencil hardness values over the untreated substrate. In addition, the cured ceramer coating shows no loss of adhesion to the substrate, as exhibited by the high cross cut adhesion values.

Example 5

A hard coat ceramer was applied to a LS snow board binding (from Preston) using curable composition (A) and coating method 1. Test method 2 was used to evaluate the surface coating. The test results listed in Table E show that the ceramer coating exhibits superior visual rating, gloss and pencil hardness values over the untreated substrate. In addition, the cured ceramer coating shows no loss of adhesion to the substrate, as exhibited by the high cross cut adhesion values.

Example 6

A hard coat ceramer was applied to a HH 4000L helmut (from Bauer) using curable composition (A) and coating method 1. Test method 2 was used to evaluate the surface coating. The test results listed in Table F show that the ceramer coating exhibits superior visual rating, gloss and pencil hardness values over the untreated substrate. In addition, the cured ceramer coating shows no loss of adhesion to the substrate, as exhibited by the high cross cut adhesion values.

Example 7

A hard coat ceramer was applied to an AIR ATTACK™ golf club shaft (from True Temper Sports, Inc.) using curable composition (A) and coating method 2. Test method 2 was used to evaluate the surface coating. The test results listed in Table G show that the ceramer coating exhibits superior visual rating values over the untreated substrate.

Example 8

A hard coat ceramer was applied to a A/C 3-71/300 arrow shaft (from Easton) using curable composition (A) and coating method 2. Test method 2 was used to evaluate the surface coating. The test results listed in Table H show that the ceramer coating exhibits superior visual rating values over the untreated substrate.

TABLE A

Atomic PROCARV ™ 5.20 ski

|  |  | Gloss angle | | | Visual | | Cross |
|---|---|---|---|---|---|---|---|
|  |  | 20° | 60° | 85° | Rating | PH | Cut Adh |
| Initial | treated | 77.1 | 93.8 | 95.8 |  | 2B | 5B |
|  | untreated | 48.1 | 73.3 | 88.3 |  | 4B |  |
| 50 | treated | 84.2 | 94.4 | 96.6 | 5 |  |  |
| passes | untreated | 9.3 | 44.2 | 86.5 | 1 |  |  |
| 100 | treated | 84.9 | 94.4 | 97.1 | 5 |  |  |
| passes | untreated | 6.7 | 39.1 | 84.9 | 1 |  |  |

TABLE B

Elan X CARVE ™ 3.0 ski

|  |  | Gloss angle | | |  |  | Cross |
|---|---|---|---|---|---|---|---|
|  |  | 20° | 60° | 85° | Rating | PH | Cut Adh |
| Initial | treated | 56.4 | 92.9 | 89.1 |  | 2B | 5B |
|  | untreated | 48.6 | 84.1 | 86 |  | 6B |  |
| 50 | treated | 56.8 | 93.1 | 86.8 | 5 |  |  |
| passes | untreated | 24.9 | 69.8 | 77.6 | 2 |  |  |
| 100 | treated | 56.1 | 93.7 | 88.5 | 5 |  |  |
| passes | untreated | 22 | 68.6 | 85.2 | 2 |  |  |

TABLE C

Easton Junior Z-BUBBLE ™ hockey stick

|  |  | Gloss angle | | | Visual | | Cross |
|---|---|---|---|---|---|---|---|
|  |  | 20° | 60° | 85° | Rating | PH | Cut Adh |
| Initial | treated | 17.2 | 66.2 | 37.6 |  |  | 5B |
|  | untreated | 16 | 61.5 | 65.1 |  |  |  |
| 50 | treated | 17.1 | 67.5 | 66.9 | 5 |  |  |
| passes | untreated | 8.3 | 47.7 | 58.9 | 3 |  |  |
| 100 | treated | 17.6 | 67.6 | 67.0 | 5 |  |  |
| passes | untreated | 6.8 | 40.4 | 54.7 | 3 |  |  |

TABLE D

Marker M 49V ™ ski binding

|  |  | Visual Rating | PH | Cross Cut Adh |
|---|---|---|---|---|
| Initial | treated |  | 2H | 5B |
|  | untreated |  | 2B |  |
| 50 passes | treated | 3 |  |  |
|  | untreated | 1 |  |  |
| 100 passes | treated | 3 |  |  |
|  | untreated | 1 |  |  |

TABLE E

Preston LS Ride snowboard binding

|  |  | Visual Rating | PH | Cross Cut Adh |
|---|---|---|---|---|
| Initial | treated |  | H | 5B |
|  | untreated |  | 2B |  |
| 50 passes | treated | 5 |  |  |
|  | untreated | 2 |  |  |
| 100 passes | treated | 5 |  |  |
|  | untreated | 2 |  |  |

TABLE F

Bauer HH-4000L Helmet

|  |  | Visual Rating | PH | Cross Cut Adh |
|---|---|---|---|---|
| Initial | treated |  | HB | 5B |
|  | untreated |  | 6B |  |
| 50 passes | treated | 5 |  |  |
|  | untreated | 3 |  |  |
| 100 passes | treated | 5 |  |  |
|  | untreated | 3 |  |  |

TABLE G

True Temper AIR ATTACK ™ golf shaft

|  |  | Visual Rating |
|---|---|---|
| 50 passes | treated | 5 |
|  | untreated | 1 |
| 100 passes | treated | 5 |
|  | untreated | 1 |

TABLE H

Easton A/C 3-71/300 arrow shaft

|  |  | Visual Rating |
|---|---|---|
| 50 passes | treated | 4 |
|  | untreated | 1 |
| 100 passes | treated | 4 |
|  | untreated | 1 |

Various modifications and alterations of this invention will be come apparent to those skilled in the art without departing from the scope and spirit of this invention.

What is claimed is:

1. A sporting goods article comprising a substrate, and a coating provided on at least a portion of a surface of said substrate, wherein said portion of said surface of said substrate has at least an outer layer comprising a material selected from the group consisting of polymers, woods, metals, non-polymeric inks, non-polymeric colorants, non-polymeric dyes, and combinations thereof, wherein said coating comprises a cured ceramer composition that is derived from ingredients comprising inorganic oxide particles and a curable organic matrix, and wherein said curable organic matrix comprises at least one ethylenically unsaturated monomer and at least one organofunctional silane monomer coupling agent and wherein said substrate is selected from the group consisting of a ski, a ski boot, a ski binding, a ski pole, a golf club, a baseball bat, a helmet, an arrow, a surfboard, an athletic shoe, or a rope.

2. The sporting goods article of claim 1 wherein said coating of said cured ceramer composition is effective to improve the abrasion resistance of said portion of said surface of said substrate.

3. The sporting goods article of claim 2 wherein said coating of said cured ceramer composition is effective to enhance the gloss of said portion of said surface of said substrate.

4. The sporting goods article of claim 1 wherein said inorganic oxide particles comprise silica particles.

5. The sporting goods article of claim 1 wherein said inorganic oxide particles comprise particles selected from the group consisting of silica, alumina, titania, zirconia, ceria, antimony, and combinations thereof, which are derived from sols of such particles.

6. The sporting goods article of claim 1 wherein said organofunctional silane monomer coupling agent comprises a hydrolyzable organofunctional silane.

7. The sporting goods article of claim 1 wherein said ethylenically unsaturated monomer comprises at least one multifunctional ethylenically unsaturated monomer.

8. The sporting goods article of claim 7 wherein said curable organic matrix further comprises at least one monofunctional ethylenically unsaturated monomer.

9. The sporting goods article of claim 8 wherein said multifunctional ethylenically unsaturated monomer is pentaerythritol triacrylate, said monofunctional ethylenically unsaturated monomer is N-vinyl caprolactam, said organofunctional silane coupling agent is (meth)acryloxypropyl trimethoxysilane, and said inorganic oxide particles comprise silica.

10. The sporting goods article of claim 1 wherein the thickness of said coating of said cured ceramer composition is about 1 to about 40 microns.

11. The sporting goods article of claim 1 wherein the thickness of said coating of said cured ceramer composition is about 2 to about 10 microns.

12. A sporting goods article comprising a substrate, and a coating provided on at least a portion of a surface of said substrate, wherein said portion of said surface of said substrate has at least an outer layer comprising a material selected from the group consisting of polymers, woods, metals, non-polymeric inks, non-polymeric colorants, non-polymeric dyes, and combinations thereof, wherein said coating comprises a cured ceramer composition that is derived from ingredients comprising inorganic oxide particles and a curable organic matrix, and wherein said curable organic matrix comprises at least one multifunctional ethylenically unsaturated monomer, and at least one organofunctional silane monomer coupling agent and wherein said substrate is selected from the group consisting of a ski, a ski boot, a ski binding, a ski pole, a golf club, a baseball bat, a helmet, an arrow, a surfboard, an athletic shoe, or a rope.

13. The sporting goods article of claim 12 wherein said curable organic matrix further comprises at least one monofunctional unsaturated ethylehically unsaturated monomer.

14. The sporting goods article of claim 13 wherein said coating of said cured ceramer composition is effective to improve the abrasion resistance of said portion of said surface of said substrate.

15. The sporting goods article of claim 14 wherein said coating of said cured ceramer composition is effective to enhance the gloss of said portion of said surface of said substrate.

16. The sporting goods article of claim 13 wherein said multifunctional ethylenically unsaturated monomer is pentaerythritol triacrylate, said monofunctional ethylenically unsaturated monomer is N-vinyl caprolactam, said organofunctional silane coupling agent is (meth)acryloxypropyl trimethoxysilane, and said inorganic oxide particles comprise silica.

17. A sporting goods article comprising a substrate, graphics, and a coating provided on at least a portion of a surface of said substrate, wherein said portion of said surface of said substrate has at least an outer layer comprising a material selected from the group consisting of polymers, woods, metals, non-polymeric inks, non-polymeric colorants, non-polymeric dyes, wherein said coating comprises a cured ceramer composition that is derived from ingredients comprising inorganic oxide particles and a curable organic matrix, and wherein said curable organic matrix comprises at least one ethylenically unsaturated monomer and at least one organofunctional silane monomer coupling agent and wherein said sporting goods article is selected from the group consisting of a ski, a ski boot, a ski binding, a ski pole, a golf club, a baseball bat, a helmet, an arrow, a surfboard, an athletic shoe, or a rope.

18. The sporting goods article of claim 17 wherein said coating of said cured ceramer composition is effective to improve the abrasion resistance of said surface of said portion of said substrate.

19. The sporting goods article of claim 18 wherein said coating of said cured ceramer composition is effective to protect the visual appearance of said graphics.

20. A ski comprising a substrate having a top surface, and a coating on at least a portion of said top surface, wherein said portion of said top surface of said substrate has at least an outer layer comprising a material selected from the group consisting of polymers, woods, metals, non-polymeric inks, non-polymeric colorants, non-polymeric dyes, and combinations thereof, wherein said coating comprises a cured ceramer composition that is derived from ingredients comprising inorganic oxide particles and a curable organic matrix, and wherein said curable organic matrix comprises at least one ethylenically unsaturated monomer and at least one organofunctional silane monomer coupling agent.

21. The ski of claim 20 wherein said coating of said cured ceramer composition is effective to improve the abrasion resistance of said portion of said top surface of said substrate.

22. The ski of claim 21 wherein said coating of said cured ceramer composition is effective to enhance the gloss of said portion of said top surface of said substrate.

23. The ski of claim 20 wherein said inorganic oxide particles comprise silica particles.

24. The ski of claim 20 wherein said inorganic oxide particles comprise particles selected from the group consisting of silica, alumina, titania, zirconia, ceria, antimony, and combinations thereof, which are derived from sols of such particles.

25. The ski of claim 20 wherein said ethylenically unsaturated monomer comprises at least one multifunctional ethylenically unsaturated monomer.

26. The ski of claim 25 wherein said curable organic matrix further comprises at least one monofunctional ethylenically unsaturated monomer.

27. The ski of claim 26 wherein said multifunctional ethylenically unsaturated monomer is pentaerythritol triacrylate, said monofunctional ethylenically unsaturated monomer is N-vinyl caprolactam, said organofunctional silane coupling agent is (meth)acryloxypropyl trimethoxysilane, and said inorganic oxide particles comprise silica.

28. A golf club comprising a shaft and a head, and a coating provided on at least a portion of a surface of said shaft, wherein said portion of said surface of said shaft has at least an outer layer comprising a material selected from the group consisting of polymers, woods, metals, non-polymeric inks, non-polymeric colorants, non-polymeric dyes, and combinations thereof, wherein said coating comprises a cured ceramer composition that is derived from ingredients comprising inorganic oxide particles and a curable organic matrix, and wherein said curable organic matrix comprises at least one ethylenically unsaturated monomer and at least one organofunctional silane monomer coupling agent.

29. The golf club of claim 28 wherein said coating of said cured ceramer composition is effective to improve the abrasion resistance of said portion of said surface of said shaft.

30. The golf club of claim 29 wherein said coating of said cured ceramer composition is effective to enhance the gloss of said portion of said surface of said shaft.

31. The golf club of claim 28 wherein said inorganic oxides particles comprise silica particles.

32. The golf club of claim 28 wherein said inorganic oxide particles comprise particles selected from the group consisting of silica, alumina, titania, zirconia, ceria, antimony, and combinations thereof, which are derived from sols of such particles.

33. The golf club of claim 28 wherein said ethylenically unsaturated monomer comprises at least one multifunctional ethylenically unsaturated monomer.

34. The golf club of claim 33 wherein said curable organic matrix further comprises at least one monofunctional ethylenically unsaturated monomer.

35. The golf club of claim 34 wherein said multifunctional ethylenically unsaturated monomer is pentaerythritol triacrylate, said monofunctional ethylenically unsaturated monomer is N-vinyl caprolactam, said organofunctional silane coupling agent is (meth)acryloxypropyl methoxysilane, and said inorganic oxide particles comprise silica.

36. A golf club comprising a shaft and a head, and a coating provided on at least a portion of a surface of said head, wherein said portion of said surface of said head has at least an outer layer comprising a material selected from the group consisting of polymers, woods, metals, non-polymeric inks, non-polymeric colorants, non-polymeric dyes, and combinations thereof, wherein said coating comprises a cured ceramer composition that is derived from ingredients comprising inorganic oxide particles and a curable organic matrix, and wherein said curable organic matrix comprises at least one ethylenically unsaturated monomer and at least one organofunctional silane monomer coupling agent.

37. The golf club of claim 36 wherein said coating of said cured ceramer composition is effective to improve the abrasion resistance of said portion of said surface of said head.

38. The golf club of claim 37 wherein said coating of said cured cermaer composition is effective to enhance the gloss of said portion of said surface of said head.

39. The golf club of claim 36 wherein said inorganic oxides particles comprise silica particles.

40. The golf club of claim 36 wherein said inorganic oxide particles comprise particles selected from the group consisting of silica, alumina, titania, zirconia, ceria, antimony, and combinations thereof, which are derived from sols of such particles.

41. The golf club of claim 36 wherein said ethylenically unsaturated monomer comprises at least one multifunctional ethylenically unsaturated monomer.

42. The golf club of claim 41 wherein said curable organic matrix further comprises at least one monofunctional ethylenically unsaturated monomer.

43. The golf club of claim 42 wherein said multifunctional ethylenically unsaturated monomer is pentaerythritol triacrylate, said monofunctional ethylenically unsaturated monomer is N-vinyl caprolactam, said organofunctional silane coupling agent is (meth)acryloxypropyl trimethoxysilane, and said inorganic oxide particles comprise silica.

44. A ski boot comprising an outer shell, and a coating provided on at least a portion of a surface of said outer shell, wherein said portion of said surface of said outer shell has at least an outer layer comprising a material selected from the group consisting of polymers, non-polymeric inks, non-polymeric colorants, non-polymeric dyes, and combinations thereof, wherein said coating comprises a cured ceramer composition that is derived from ingredients comprising inorganic oxide particles and a curable organic matrix, and wherein said curable organic matrix comprises at least one ethylenically unsaturated monomer and at least one organofunctional silane monomer coupling agent.

45. The ski boot of claim 44 wherein said coating of said cured ceramer composition is effective to improve the abrasion resistance of said portion of said surface of said outer shell.

46. The ski boot of claim 45 wherein said coating of said cured ceramer composition is effective to enhance the gloss of said portion of said surface of said outer shell.

47. The ski boot of claim 44 wherein said inorganic oxide particles comprise silica particles.

48. The ski boot of claim 44 wherein said inorganic oxide particles comprise particles selected from the group consisting of silica, alumina, titania, zirconia, ceria, antimony, and combinations thereof, which are derived from sols of such particles.

49. The ski boot of claim 44 wherein said ethylenically unsaturated monomer comprises at least one multifunctional ethylenically unsaturated monomer.

50. The ski boot of claim 49 wherein said curable organic matrix further comprises at least one monofunctional ethylenically unsaturated monomer.

51. The ski boot of claim 50 wherein said multifunctional ethylenically unsaturated monomer is pentaerythritol triacrylate, said monofunctional ethylenically unsaturated monomer is N-vinyl caprolactam, said organofunctional silane coupling agent is (meth)acryloxypropyl trimethoxysilane, and said inorganic oxide particles comprise silica.

52. A helmet comprising an outer shell, and a coating provided on at least a portion of a surface of said outer shell, wherein said portion of said surface of said outer shell has at least an outer layer of a material selected from the group consisting of polymers, non-polymeric inks, non-polymeric colorants, non-polymeric dyes, and combinations thereof, wherein said coating comprises a cured ceramer composition that is derived from ingredients comprising inorganic oxide particles and a curable organic matrix, and wherein said curable organic matrix comprises at least one ethylenically unsaturated monomer and at least one organofunctional silane monomer coupling agent.

53. The helmet of claim 52 wherein said coating of said cured ceramer composition is effective to improve the abrasion resistance of said portion of said surface of said outer shell.

54. The helmet of claim 53 wherein said coating of said cured ceramer composition is effective to enhance the gloss of said portion of said surface of said outer shell.

55. The helmet of claim 52 wherein said inorganic oxide particles comprise silica particles.

56. The helmet of claim 52 wherein said inorganic oxide particles comprise particles selected from the group consisting of silica, alumina, titania, zirconia, ceria, antimony, and combinations thereof, which are derived from sols of such particles.

57. The helmet of claim 52 wherein said ethylenically unsaturated monomer comprises at least one multifunctional ethylenically unsaturated monomer.

58. The helmet of claim 57 wherein said curable organic matrix further comprises at least one monofunctional ethylenically unsaturated monomer.

59. The helmet of claim 58 wherein said multifunctional ethylenically unsaturated monomer is pentaerythritol triacrylate, said monofunctional ethylenically unsaturated monomer is N-vinyl caprolactam, said organofunctional silane coupling agent is (meth)acryloxypropyl trimethoxysilane, and said inorganic oxide particles comprise silica.

* * * * *

UNITED STATES PATENT AND TRADEMARK OFFICE
CERTIFICATE OF CORRECTION

PATENT NO. : 6,458,462 B1
DATED : October 1, 2002
INVENTOR(S) : Kang, Soonkun

It is certified that error appears in the above-identified patent and that said Letters Patent is hereby corrected as shown below:

<u>Title page,</u>
Item [57], ABSTRACT,
Line 5, delete "thereof The" and insert in place thereof -- thereof. The --

<u>Column 1,</u>
Line 58, delete "may also may protect" and insert in place thereof -- may also protect --

<u>Column 5,</u>
Line 7, delete "thereof" and insert in place thereof -- thereof. --
Line 33, delete "skis" and insert in place thereof -- ski --

<u>Column 6,</u>
Line 35, delete "R5" and insert in place thereof -- $R^5$ --
Line 56, delete "1,3,6, -hexanetriol," and insert in place thereof -- 1,3,6-hexanetriol, --

<u>Column 7,</u>
Line 62, delete "thereof Examples" and insert in place thereof -- thereof.  Examples --

<u>Column 8,</u>
Line 30, delete "$R_1$" and insert in place thereof -- $R^1$ --

<u>Column 10,</u>
Line 54, delete "of(meth)-acrylic" and insert in place thereof -- of (meth)-acrylic --

<u>Column 11,</u>
Line 31, delete "benzophenone." and insert in place thereof -- benzophenone. --

<u>Column 13,</u>
Line 10, delete "%." and insert in place thereof -- %, --
Line 35, delete "Schnectady Chemicals, Inc., Schnectady," and insert in place thereof -- Schenectady Chemicals, Inc., Schenectady, --
Line 36, delete "Inc. Norwalk," and insert in place thereof -- Inc., Norwalk, --
Line 53, delete "alkyld," and insert in place thereof -- alkyl, --

UNITED STATES PATENT AND TRADEMARK OFFICE
CERTIFICATE OF CORRECTION

PATENT NO. : 6,458,462 B1
DATED : October 1, 2002
INVENTOR(S) : Kang, Soonkun

It is certified that error appears in the above-identified patent and that said Letters Patent is hereby corrected as shown below:

Column 16,
Line 15, delete "Mich. Product," and insert in place thereof -- Mich., product --
Line 17, delete "10-5" and insert in place thereof -- $10^{-5}$ --
Line 20, delete "butyl4-" and insert in place thereof -- butyl-4- --.

Column 17,
Line 7, delete "Rockville Md.)" and insert in place thereof -- Rockville, Md.) --

Column 18,
Line 25, delete "a" and insert in place thereof -- an --
Line 59, delete "helmut" and insert in place thereof -- helmet --

Column 19,
Line 45, delete "Rating" and insert in place thereof -- Visual Rating --

Column 20,
Line 66, delete "be come" and insert in place thereof -- become --

Signed and Sealed this

Twelfth Day of October, 2004

JON W. DUDAS
*Director of the United States Patent and Trademark Office*